Patented June 3, 1930

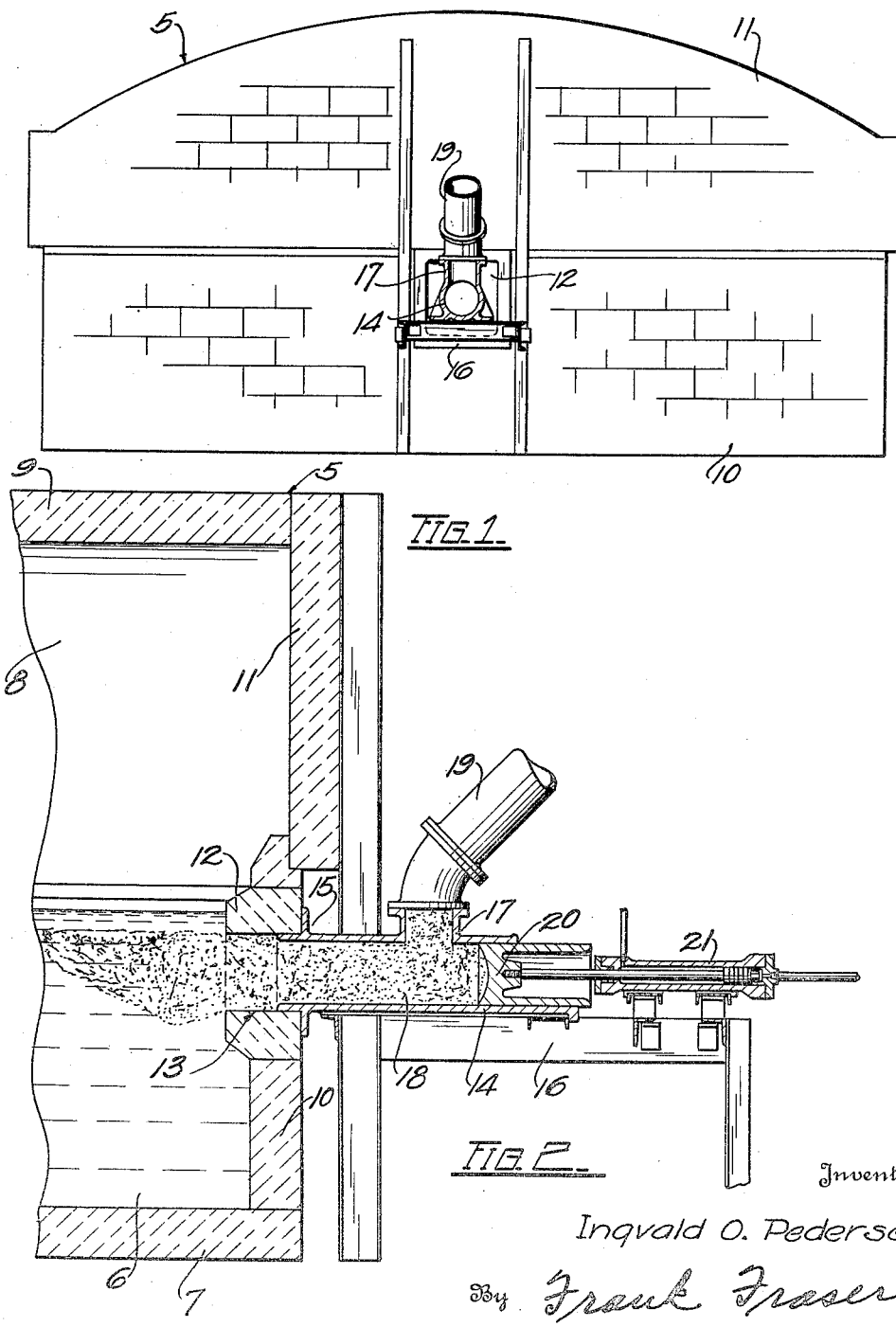

1,761,229

UNITED STATES PATENT OFFICE

INGVALD O. PEDERSEN, OF PITTSBURGH, PENNSYLVANIA, ASSIGNOR TO LIBBEY-OWENS GLASS COMPANY, OF TOLEDO, OHIO, A CORPORATION OF OHIO

BATCH-FEEDING MECHANISM

Application filed October 25, 1926. Serial No. 143,817.

This invention relates to an improved method and means for feeding batch or cullet into a glass melting furnace.

In certain types of glass tank furnaces, the glass batch containing the ingredients from which the molten glass is produced is fed into the tank through a so-called dog house positioned at one end thereof. This dog house is open to the atmosphere so that when the charge of batch is fed into the furnace, the interior thereof is exposed to cold drafts and other disturbing atmospheric conditions. These cold drafts set up undesirable conditions in the furnace and should be avoided. Also, since the dog house is one of the first parts of the tank to be corroded, it is also desirable that this weak point should be eliminated.

Again, in those types of tank furnaces described herein above, the batch is fed thereto above the level of the mass of molten glass contained therein. A certain percentage of this batch is in the form of dust and the flames passing back and forth within the furnace catch up this batch dust and blow it into the furnace checker works. This dust has a great corroding and fluxing action on the checker works and also upon the bricks forming the side walls and cover arch of the furnace with the result that these bricks wear out or melt much more quickly than would otherwise be the case. Again the melting of the checker work bricks tends to clog up the checker works.

An important object of the present invention is to provide improved means for feeding batch into a tank furnace whereby the usual dog house now commonly employed may be eliminated.

Another object of the invention is to provide improved means of the above character whereby the interior of the furnace will not be exposed to cold drafts or other disturbing atmospheric conditions during the feeding of the batch thereto.

A further object of the invention is to provide improved means for feeding the batch into the furnace beneath the level of the molten glass therein.

A still further object of the invention is to provide means for feeding the batch into the furnace in such a manner that the batch will be constantly covered by a film of molten glass whereby the batch dust will not be exposed to the direct action of the flames within the furnace.

A still further object of the invention is the provision of improved means whereby batch can be fed into the furnace practically continuously.

Still another object of the invention is to provide improved batch feeding means of the above character, including a cylinder in communication with the furnace for receiving the glass batch and a reciprocating plunger operable within the cylinder for forcing the said batch into the furnace.

Other objects and advantages of the invention will become more apparent during the course of the following description when taken in connection with the accompanying drawings.

In the drawings forming a part of this application and wherein like numerals are employed to designate like parts throughout the same, Fig. 1 is an end view of a tank furnace constructed in accordance with the present invention, and showing partially in section the improved means for feeding the glass batch thereto, and Fig. 2 is a vertical longitudinal section through a portion of the furnace and the improved means for charging the same.

Referring now more in detail to the drawings there has been disclosed a portion of a glass melting furnace including a tank 5 adapted to contain a mass of molten glass 6. The tank 5 comprises a bottom wall 7 having side walls 8 extending upwardly therefrom, and a cover arch 9 supported on the side walls 8. One end of the tank is closed by a lower end wall 10 upon which is supported an upper end wall 11, it being noted that the lower wall 10 extends slightly above the surface of the molten glass 6.

In accordance with the present invention there is arranged within the lower end wall 10 a removable charge block 12 provided with a transverse opening 13 which is preferably though not necessarily arranged slightly beneath the level of the molten glass 6. This block is removable so that when it becomes worn or corroded it may be readily removed and replaced by a new block. The block 12 also protrudes some distance into the tank 5 as shown, partly for the purpose of feeding the batch into the tank a certain distance beyond the end walls 10 and 11, and partly to prolong the life of the block.

The numeral 14 designates a substantially long horizontally arranged cylinder having one end thereof received within the opening 13 in the tank block 12, said cylinder being provided adjacent one end thereof with an annular stop shoulder 15 adapted to abut against the block 12. The cylinder 14 is carried upon suitable supporting structure 16 and is provided adjacent its outer end with a lateral vertical inlet 17 for receiving the glass batch or cullet 18. This batch is fed continuously from the usual type of storage hopper through a chute 19, preferably arranged at substantially a 45° angle to the inlet 17.

Slidably arranged within the cylinder 14 is a reciprocating plunger 20, which, as shown, is being operated by hydraulic means 21. However, it will be obvious that this plunger can be operated by either steam, air, electric power, or other means found suitable for this purpose.

In the operation of the invention, the glass batch or cullet 18 is fed into the cylinder 14 through the inlet 17 and the plunger 20 operating within the cylinder will force the batch through the opening 13 in the block 12 into the tank 5. As shown, the batch is fed into the tank beneath the level of the molten glass 6, but it will be apparent that it can be fed into the tank above the level of the molten glass if found more desirable.

As the glass batch is fed into the tank it gradually melts to produce the mass of molten glass 6. Inasmuch as the batch is fed into the furnace beneath the level of the molten glass 6, there will always be a film of molten glass covering the batch so that the batch dust will not be exposed to the direct action of the flames. Consequently, the dust will not be blown by the flames into the checker works or into contact with the bricks forming the side walls and cover arch of the furnace and this will not be subjected to the corroding or fluxing action of the batch dust.

Also, with such an arrangement as described hereinabove, the interior of the tank will not be exposed to cold drafts from the atmosphere or to any other disturbing atmospheric conditions during the feeding of the batch thereto which will result in the setting up of more desirable conditions within the tank. The supporting structure 16 for the tank charging means is so constructed that it can be readily moved out of position when the charge block 12 is being replaced or when it is desired to repair or renew any of the other parts of the apparatus. The plunger 20, it will be noted, never comes into contact with the molten glass 6, but is always forcing a perpetual column of batch into the furnace. A comparatively large charge of batch can be made at intervals, or the batch can be filled in in comparatively small amounts practically continuously.

The quantity of the batch fed into the tank will be determined by the number and the length of the strokes made by the plunger 20. The column of batch between the plunger in its withdrawal position and the tank will be uniformly the same quantity, and it is believed that proper regulation of the amount of batch fed into the tank can be readily accomplished. Any desired number and size of charging units can be accommodated to any particular size of furnace in connection with which they may be associated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In combination, a glass melting furnace including a tank, a removable charge block arranged in one wall of said tank and provided with an opening, and means for forcing a charge of batch through said opening without exposing the interior of the tank to the atmosphere.

2. In combination, a glass melting furnace including a tank, a charge block arranged in one wall of the tank and having an opening therein, and means for forcing a charge of glass batch ingredients through said opening without exposing the interior of the tank to the atmosphere, the inner end of the charge block extending within the tank and beyond the wall with which it is associated.

Signed at Toledo, in the county of Lucas and State of Ohio, this 18th day of October, 1926.

INGVALD O. PEDERSEN.